(12) United States Patent
Hassani et al.

(10) Patent No.: US 10,924,924 B1
(45) Date of Patent: Feb. 16, 2021

(54) OUT-OF-BAND KEY SHARING USING NEAR-FIELD COMMUNICATION

(71) Applicant: FORD GLOBAL TECHNOLOGIES, LLC, Dearborn, MI (US)

(72) Inventors: Ali Hassani, Ann Arbor, MI (US); Aaron Matthew DeLong, Toledo, OH (US); Vivekanandh Elangovan, Canton, MI (US); Hamid M. Golgiri, Livonia, MI (US); Ryan Edwin Hanson, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/564,750

(22) Filed: Sep. 9, 2019

(51) Int. Cl.
| | |
|---|---|
| *H04W 12/04* | (2009.01) |
| *H04W 76/10* | (2018.01) |
| *H04W 4/80* | (2018.01) |
| *H04W 12/00* | (2021.01) |
| *B60R 25/23* | (2013.01) |
| *H04W 12/06* | (2021.01) |

(52) U.S. Cl.
CPC ....... *H04W 12/04031* (2019.01); *B60R 25/23* (2013.01); *H04W 4/80* (2018.02); *H04W 12/003* (2019.01); *H04W 12/0609* (2019.01); *B60R 2325/101* (2013.01); *B60R 2325/103* (2013.01); *B60R 2325/205* (2013.01)

(58) Field of Classification Search
CPC ......... H04W 12/04031; H04W 21/003; H04W 4/80; H04W 12/0609; H04W 76/10; H04W 12/06; H04L 9/08; H04L 9/3226; B60R 25/23; B60R 2325/101; B60R 2325/205; B60R 2325/103
See application file for complete search history.

(56) References Cited

U.S. PATENT DOCUMENTS

| 10,231,273 B2 | 3/2019 | Smith | |
|---|---|---|---|
| 2011/0028091 A1* | 2/2011 | Higgins | H04W 12/06 455/41.2 |

(Continued)

FOREIGN PATENT DOCUMENTS

WO   2019067105 A1   4/2019

OTHER PUBLICATIONS

Han et al., Short Paper: MVSec: Secure and Easy-to-Use Pairing of Mobile Devices with Vehicles, ACM WiSec 2014 (7th ACM Conference on Security and Privacy in Wireless and Mobile Networks), Jul. 23-25, 2014, Oxford, UK.

(Continued)

*Primary Examiner* — Andrew Wendell
(74) *Attorney, Agent, or Firm* — Frank L. Lollo; Brooks Kushman P.C.

(57) ABSTRACT

A vehicle includes a keypad mounted to an exterior of the vehicle, the keypad having a plurality of buttons, each button representing both a first value and a second value. The vehicle further includes a body controller, programmed to receive an input sequence entered via the keypad, validate whether the input sequence matches a predefined keycode, assuming the input sequence correctly entered the first value or the second value according to indications of which values of the keycode are the first value and which are the second value, and confirm pairing a mobile device to the vehicle responsive to the input sequence matching the keycode.

17 Claims, 4 Drawing Sheets

(56) References Cited

U.S. PATENT DOCUMENTS

| | | | | |
|---|---|---|---|---|
| 2011/0119491 A1* | 5/2011 | Nocera | ............... | H04L 9/3271 |
| | | | | 713/170 |
| 2011/0210831 A1* | 9/2011 | Talty | ............... | H04B 5/0031 |
| | | | | 340/10.51 |
| 2013/0303131 A1* | 11/2013 | Sadhu | ............... | H04L 12/2827 |
| | | | | 455/414.1 |
| 2016/0278151 A1* | 9/2016 | Kwon | ............... | H04W 76/14 |
| 2016/0371907 A1* | 12/2016 | Ma | ............... | E05B 17/10 |
| 2017/0018129 A1* | 1/2017 | Huebner | ............... | B60K 35/00 |
| 2018/0234843 A1 | 8/2018 | Smyth et al. | | |
| 2018/0260582 A1* | 9/2018 | Brouwer | ............... | H04L 67/18 |
| 2018/0368030 A1 | 12/2018 | Hrabak et al. | | |
| 2019/0174239 A1* | 6/2019 | Niklaus | ............... | H04R 25/602 |
| 2020/0013241 A1* | 1/2020 | Johnson | ............... | B60R 25/248 |

OTHER PUBLICATIONS

Rosati, Connections Summit, ESCRYPT Embedded Security by ETAS, a Peer-to-Peer Approach to Digital Key Sharing for Vehicle Access & Control, Mar. 2018.
Hyundai to Demonstrate Digital Car Key Secured by Trustonic Application Protection at the New York Auto Show, Apr. 9, 2019.
Fingas, 'Digital Key' Standard Uses Your Phone to Unlock Your Car, Jun. 20, 2018.
Busold et al., Smart Keys for Cyber-Cars: Secure Smartphone-Based NFC-Enabled Car Immobilizer, CODASPY 2013 (3rd ACM Conference on Data and Application Security and Privacy), Feb. 18-20, 2013, San Antonio, Texas.

* cited by examiner

OUT-OF-BAND KEY SHARING USING NEAR-FIELD COMMUNICATION

TECHNICAL FIELD

Aspects of the disclosure generally relate to out-of-band key sharing using near-field communication (NFC) through the use of vehicle keypads.

BACKGROUND

Vehicle key fobs may be used to allow a user to gain access to a vehicle. Some fob devices operate such that when a key is pressed on the fob, the device sends a code to the vehicle to instruct the vehicle to unlock the vehicle. Passive-entry key fobs operate to provide response to a challenge pulse train sent by the vehicle, where if a proper response is received by the vehicle then the door may be unlocked by a user grasping the door handle.

Phone-as-a-key (PaaK) systems are being introduced to allow users to utilize their phones to unlock a vehicle without requiring a key fob device. These systems may operate similar to a key fob, but where the phone communicates with the vehicle over Bluetooth Low Energy or other mobile device wireless technologies. The communication may require a bonded state, whereby an exchange of encryption keys between the phone and vehicle is performed. When performing the bonding, the user may be asked to input a confirmation code to verify the device identifiers.

Near-field communication (NFC) technology is a mechanism by which electronic devices establish communication by being brought within a short distance of one another (on the order of 4 centimeters). NFC tags or cards are data stores which can be read by NFC reader devices. NFC cards may be used for a variety of applications, including contactless payments and access control. In some cases, NFC functionality may be implemented by smartphones or other mobile devices.

SUMMARY

In one or more illustrative examples, a vehicle includes a keypad mounted to an exterior of the vehicle, the keypad having a plurality of buttons, each button representing both a first value and a second value; and a body controller, programmed to receive an input sequence entered via the keypad, validate whether the input sequence matches a predefined keycode, assuming the input sequence correctly entered the first value or the second value according to indications of which values of the keycode are the first value and which are the second value, and confirm pairing a mobile device to the vehicle responsive to the input sequence matching the keycode.

In one or more illustrative examples, a method includes receiving a keycode, including a sequence of values to pair a mobile device to a vehicle; indicating which of the sequence of values are even and which are odd; receiving an input sequence entered via a keypad of the vehicle, the keypad having a plurality of buttons, each button representing both an even value and an odd value such that it cannot be determined whether an even value or an odd value was entered; validating, by a controller, whether the input sequence matches the keycode, assuming the input sequence entered even or odd values correctly according to predefined indications provided to the controller of which values of the keycode are even and which are odd; and confirming access responsive to the input sequence matching the keycode.

In one or more illustrative examples, a system includes a keypad mounted to an exterior of a vehicle, the keypad having a plurality of buttons, each button representing both an even value and an odd value; a body controller; and a short-range wireless controller, programmed to identify an initial wireless connection from a mobile device to the vehicle, identify to use the keypad for keycode pairing of the mobile device to the vehicle responsive to receipt, to the keypad, of receipt of a predefined input, generate a keycode including a sequence of values, send the keycode to the mobile device for display, and indicate to the body controller which of the sequence of values of the keycode are even and which are odd, wherein the body controller is programmed to receive an input sequence entered via the keypad, validate whether the input sequence matches a predefined keycode, assuming the input sequence always entered even or odd values according to indications of which values of the keycode are even and which are odd, and confirm access responsive to the input sequence matching the keycode.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Vehicle sharing is a useful feature of PaaK systems. Vehicle sharing allows a user to share a digital key from the user's device to a trusted user's phone or other mobile device. Once shared, the key may allow the trusted user to gain access to the vehicle and/or use the vehicle for transportation. However, the vehicle should not be required to have cellular connectivity. For instance, if a cellular subscription for the vehicle terminates, the user should still be able to share their vehicle.

In some systems the user may be required to input a Bluetooth low energy (BLE) confirmation code on the inside of the vehicle to confirm the device bonding process. This would be undesirable for vehicle sharing, as the new user would be required to enter the vehicle and input the code to gain PaaK capabilities. Instead of requiring the recipient user to enter a code inside the vehicle, an alternative process for out-of-band pairing may be utilized. In the scenario where the mobile device of the sharing user receives a key share acknowledgement from a cloud server, the mobile device may receive a secure payload from the server that includes the digital key. In some use cases, this will be a consumer access key (CAK), which is a digital key that allows direct out-of-band pairing to the wireless module. Alternatively, this payload may include the CAK and also a unique access key to grant unlock status. That access key may be unique for key sharing purposes. NFC may then be utilized to obtain vehicle access with the transmission of a secure activation request, as relayed by the key share requester's mobile device, such that temporary access may be granted via an external vehicle keypad. This approach provides vehicle security and also does not require vehicle cellular connectivity for the pairing stage.

Figure 1:
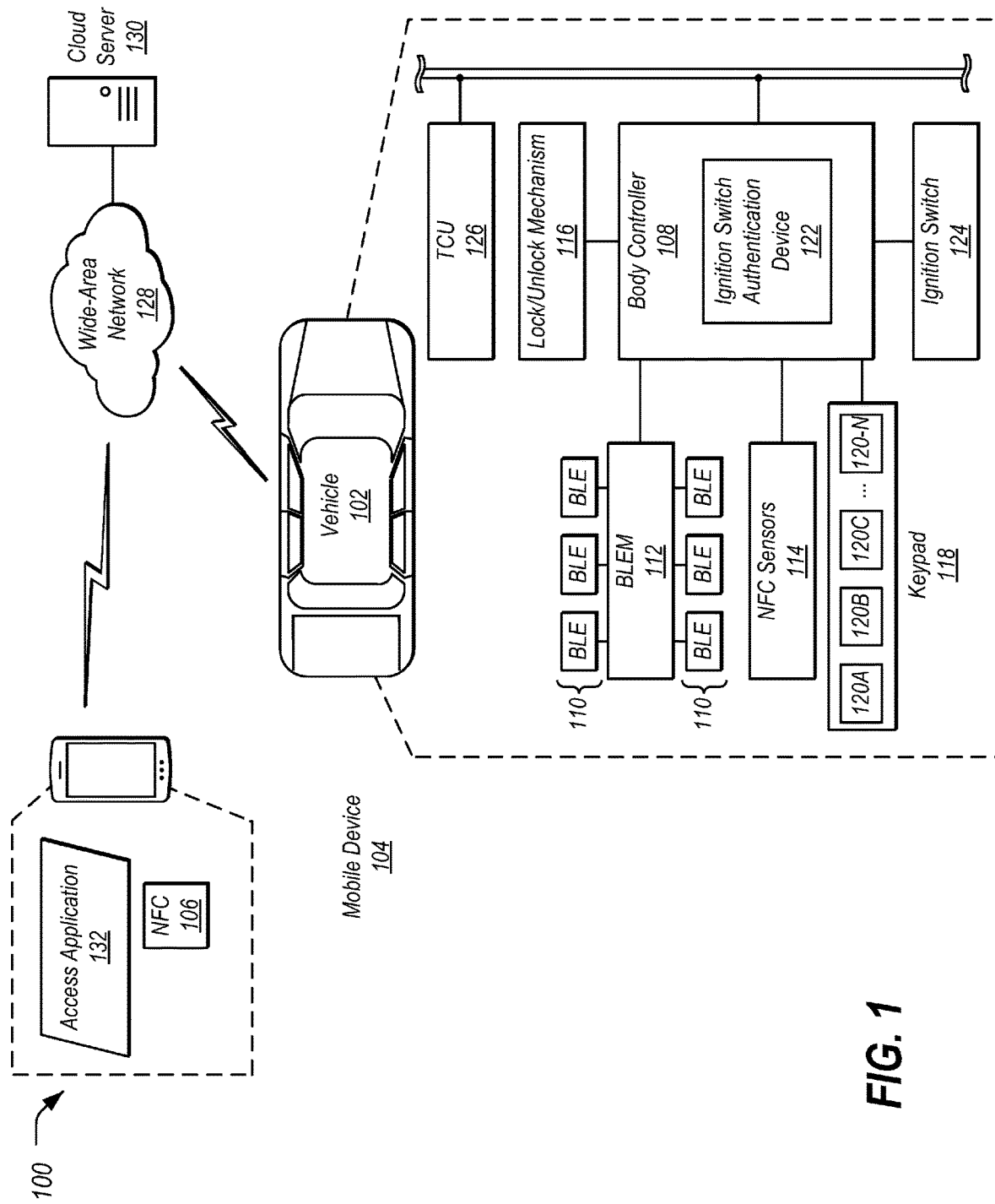
FIG. 1 illustrates an example keyless entry system for a vehicle implementing out-of-band key sharing using NFC.

FIG. 1 illustrates an example keyless entry system 100 for a vehicle 102 implementing out-of-band key sharing using near-field communication (NFC). The system 100 may include a body controller 108 in communication with a BLE module (BLEM) 112 having a plurality of BLE transceivers 110, with NFC sensors 114, and also with a keypad 118. In some cases, the NFC sensors 114 may be integrated into the keypad 118. These devices may be used to receive authentication information from a mobile device 104 to facilitate access to the vehicle 102.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a battery-electric vehicle (BEV) powered by one or more electric motors, a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as VINs.

The mobile device 104 may be any of various types of portable computing device, such as cellular phones, tablet computers, smart watches, laptop computers, portable music players, or other devices having processing and communications capabilities. The mobile device 104 may include one or more processors configured to execute computer instructions, and a storage medium on which the computer-executable instructions and/or data may be maintained. The mobile device 104 may further include various wireless transceivers, such as a BLUETOOTH or BLE transceiver, and/or NFC 106 functionality.

The controller 108 may be one of a plurality of controllers of the vehicle 102 configured to perform and manage various vehicle 102 functions under the power of the vehicle battery and/or drivetrain. The controllers may include hardware having processing and communications capabilities. As depicted, the controller 108 is represented as a discrete hardware component. However, vehicle controllers such as the controller 108 may share physical hardware, firmware, and/or software, such that the functionality of multiple controllers may be integrated into a single controller, and that the functionality of various such controllers may be distributed across a plurality of controllers.

The BLE transceivers 110 may be configured to facilitate communication between the mobile device 104 and the vehicle 102. For instance, each BLE transceiver 110 may be connected to one or more antennas to form an array that may be used to triangulate or otherwise detect the location of the mobile device 104. The BLE transceivers 110 may be controlled by the BLEM 112, which includes a memory and a processor programmed to send and receive messaging between the mobile device 104 and the vehicle 102, e.g., to provide for the performance of challenge-response sequences and/or to receive/transmit commands from/to the mobile device 104/vehicle 102. In an example, the mobile device 104 may connect to the closest-detected BLE transceiver 110 to communicate with the BLEM 112 of the vehicle 102.

The NFC sensors 114 may include one or more sensors on the exterior of the vehicle which may be used in conjunction with the mobile device 104 to unlock or lock the vehicle 102 using NFC. Additionally or alternately, the NFC sensors 114 may further include NFC sensors 114 within the vehicle which may be used in conjunction with the mobile device 104 to start the vehicle 102.

A lock/unlock mechanism 116 may be operably coupled to the controller 108. The controller 108 may be configured to control the lock/unlock mechanism 116 to lock/unlock doors of the vehicle 102 in response to the wireless commands transmitted to the body controller 108 by the mobile device 104 via BLE. Additionally, the controller 108 may control the lock/unlock mechanism 116 to unlock the doors responsive to receipt of a signal from the exterior NFC sensors 114 indicative of information received via the NFC 106 functionality of the mobile device 104.

The keypad 118 may be in electrical communication with the controller 108. The keypad 118 may be positioned on an exterior portion or section of the vehicle 102. In one example, the keypad 118 may be hardwired to the controller 108. In another example, the keypad 118 may be in RF communication with the controller 108. The keypad 118 includes a plurality of mechanical pads, capacitive pads or other buttons 120a-120n which, for example, correspond to numeric characters, alpha characters or any combination of alpha-numeric characters. Thus, to enter a digit of an access code, such as a personal code or factory code or other personal identification number, the user may simply touch or push the corresponding button 120.

In an example, the keypad 118 may transmit commands via hardwired signals to the controller 108 which correspond to a sequence of numeric characters, alpha characters, or alpha-numeric characters in response to the user selecting various buttons 120a-120n. In another example, the keypad 118 may transmit commands via RF signals which correspond to the alpha, numeric, or alpha-numeric characters to the controller 108 in response to the user selecting various buttons 120a-120n. In some cases, each of the buttons may represent multiple characters, symbols, or numbers. For instance, in some implementations each button represents two consecutive numbers, one even, one odd. The controller 108 may control the lock/unlock mechanism 116 to lock/unlock the doors in response to receiving the commands, e.g., two or more signals (RF or hardwired) which correspond to a valid sequence of alpha, numeric, or alpha-numeric characters.

The controller 108 may include an ignition switch authentication device 122. The ignition switch authentication device 122 may also include an RF receiver (not shown) and an antenna (not shown) for receiving RF signals transmitted by the RF transmitters of the keys. It should be noted that in some examples, the ignition switch authentication device 122 may be implemented as a standalone controller (or module). The ignition switch authentication device 122 is configured to authenticate the particular type of mechanism used to start the vehicle 102. For example, with the PATS implementation, the key is inserted into an ignition switch 124 to start the vehicle 102. In such a case, the RF transmitter of the key transmits RF signals having encrypted data therein to the receiver of the ignition switch authentication device 122. The ignition switch authentication device 122 decrypts the data to authenticate the key prior to allowing the user to start the vehicle 102.

The vehicle 102 may also include a telematics control unit (TCU) 126. The TCU 126 may include network hardware configured to facilitate communication between the vehicle and other devices of the system 100. For example, the TCU 126 may include or otherwise access a cellular modem configured to facilitate communication with a wide-area network 128. The wide-area network 128 may include one or more interconnected communication networks such as the Internet, a cable television distribution network, a satellite link network, a local area network, and a telephone network, as some non-limiting examples. The cloud server 130 may be an example of a networked computing device that is accessible to the vehicle 102 and/or the mobile device 104 over the wide-area network 128.

The mobile device 104 may include an access application 132 installed to a memory of the mobile device 104. The access application 132 may allow the user to utilize the mobile device 104 as an access device to provide entry to the vehicle 102. In addition, the access application 132 may be able to receive information from the cloud server 130, e.g., transmitted from the cloud server 130 over the wide-area network 128.

Figure 2:
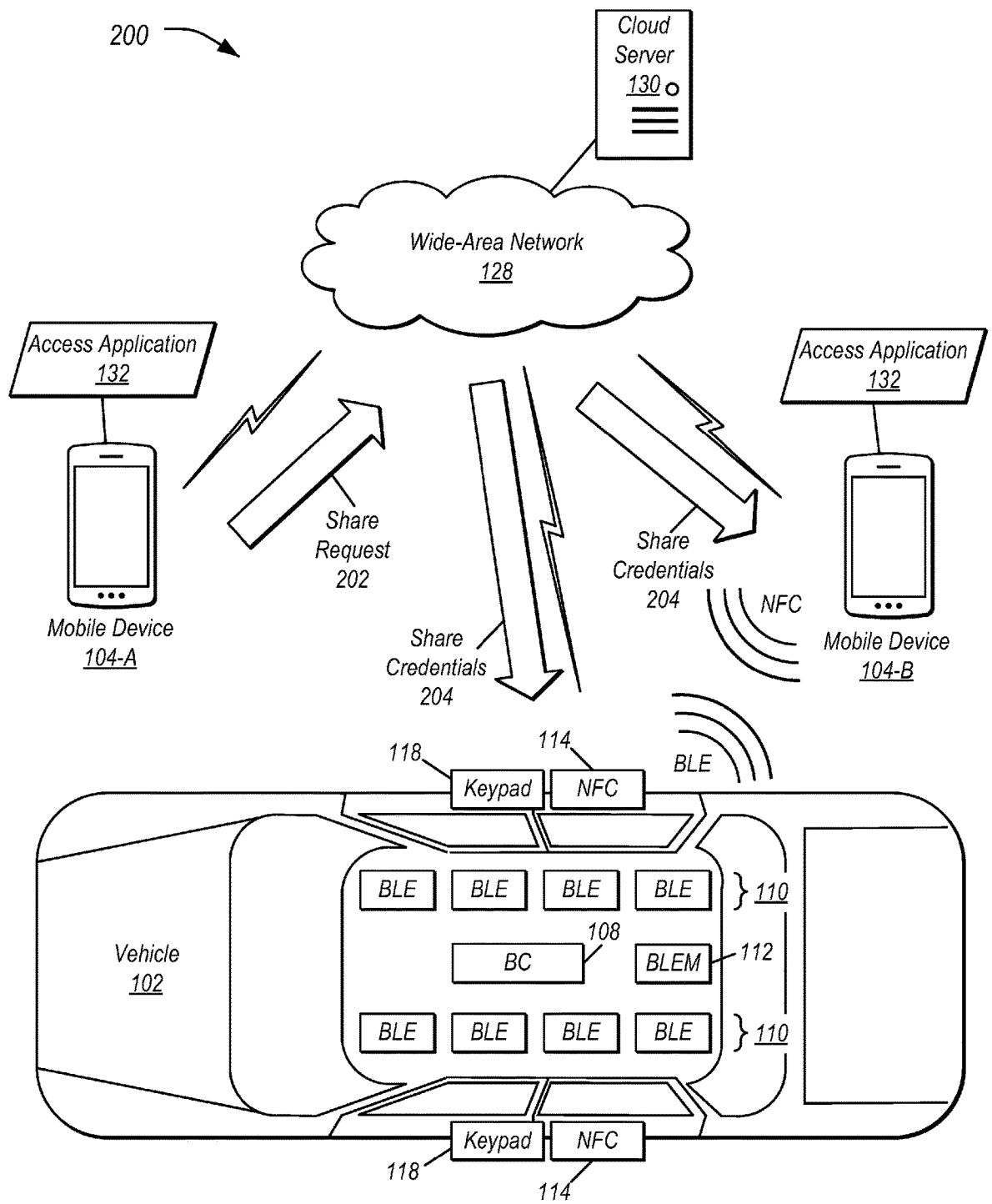
FIG. 2 illustrates an example scenario in which a first mobile device is sharing access to a vehicle with a second mobile device.

FIG. 2 illustrates an example scenario 200 in which a first mobile device 104-A is sharing access to a vehicle 102 with a second mobile device 104-B. In this scenario 200, the mobile device 104-A has utilized the access application 132 to send a share request 202 over the wide-area network 128 to the cloud server 130. The share request 202 indicates assent by the user of the mobile device 104-A to allow the user of the mobile device 104-B access to the vehicle 102. The cloud server 130 receives this share request 202 over the wide-area network 128. In response, the cloud server 130 sends, over the wide-area network 128, share credentials 204 to the mobile device 104-B and to the vehicle 102. These share credentials 204 may be used by the vehicle 102 to validate access of the mobile device 104-B to the vehicle 102.

The share credentials 204 may include, in an example, a secure payload from the cloud server 130 that includes a digital access key (e.g., the CAK). In some use cases, this will be only the CAK, which allows direct out-of-band pairing to the BLEM 112.

Figure 3:
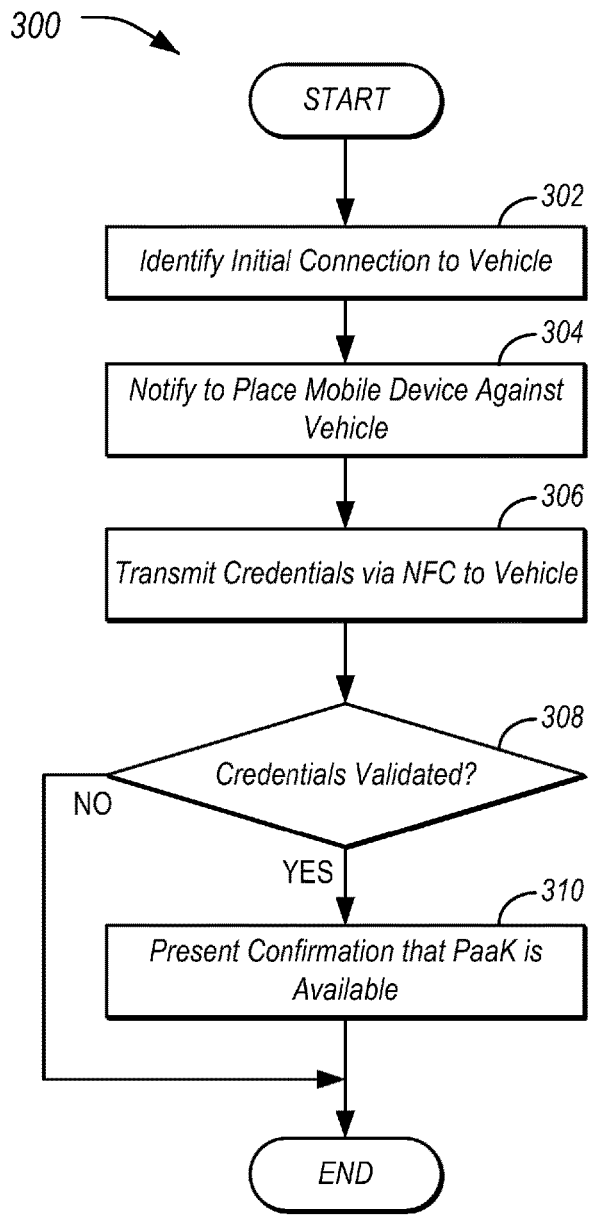
FIG. 3 illustrates an example process for the direct out-of-band pairing of a mobile device to the Bluetooth low energy module to facilitate vehicle access.

FIG. 3 illustrates an example process 300 for the direct out-of-band pairing of a mobile device 104 to the BLEM 112 to facilitate vehicle 102 access. In an example, the process 300 may be performed by a mobile device 104 (e.g., the mobile device 104-B in the scenario 200), in the context of the system 100. As shown, the process 300 begins at operation 302 responsive to the identification by the mobile device 104 of an initial connection to the vehicle 102. This initial connection may be, for instance, via BLE.

At operation 304, the mobile device 104 notifies the user to place the mobile device 104 against the vehicle 102. This may be done to allow the mobile device 104 to transmit credentials from the mobile device 104 to the vehicle 102. The notification to the user may be performed in various ways and in various combinations. In one example, the mobile device 104 may provide a visual notification to a screen of the mobile device 104. In another example, the mobile device 104 may provide an audible notification, such as a predefined chime or a voice message requesting the user to place the mobile device 104 within proximity to the vehicle 102. The voice message or visual notification may indicate to the user the location of where the mobile device 104 should be placed, e.g., against an NFC sensor 114 of the vehicle integrated with the keypad 118. In yet another example, the mobile device 104 may provide haptic feedback using a haptic feedback device of the mobile device 104. Responsive to the notification, the user may place the mobile device 104 to the vehicle 102 such that NFC communication between the NFC functionality 106 of the mobile device 104 and the NFC sensors 114 of the vehicle is provided for.

The mobile device 104 provides credentials to the vehicle 102 at operation 306. In an example, this transfer may be performed via the NFC communication between the NFC functionality 106 of the mobile device 104 and the NFC sensors 114 of the vehicle. The credentials that are transferred may include, for instance, the CAK received by the mobile device 104 and the vehicle 102. Responsive to receipt of the credentials, the NFC sensors 114 may provide the received information to the controller 108, which may validate that the CAK matches that which was received from the cloud server 130.

At operation 308, the mobile device 104 may determine whether the credentials were validated. In an example, the mobile device 104 may receive confirmation over NFC from the vehicle 102 that the credentials were or were not validated as authorized. In another example, the mobile device 104 may not receive any response from the vehicle 102, which may be interpreted after a predetermined timeout period to be a lack of authorization. If the mobile device 104 is authorized, control passes to operation 310. Otherwise, the process 300 ends.

At 310, the mobile device 104 presents confirmation that the mobile device 104 may be utilized as a PaaK. In an example, the mobile device 104 may execute one or more of to: display a notification indicating so to a display of the mobile device 104, make a sound indicative of successful authorization, and/or vibrate in a manner indicative of successful authorization. After operation 310, the process 300 ends.

Referring back to FIG. 2, the secure payload may additionally or alternately include a unique access key to the controller 108 that may be used to grant access to the vehicle 102. That access key may be unique to a specific user and may be of a length suitable for typing into the keypad 118 of the vehicle 102. The NFC functionality 106 of the mobile device 104 and the NFC sensors 114 of the vehicle 102 may then be utilized to provide vehicle access with the transmission of a secure activation request from the mobile device 104-B to the vehicle 102, such that temporary access may be granted to the vehicle 102 via the keypad 118. This approach provides vehicle security and, also, does not require vehicle cellular connectivity at any stage.

Figure 4:
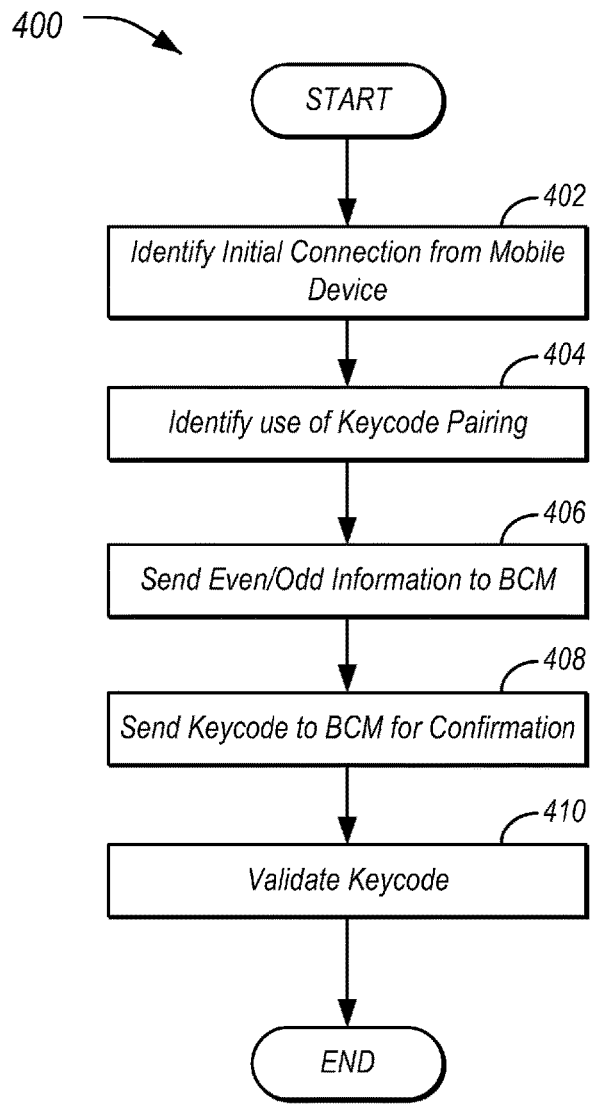
FIG. 4 illustrates an example process for the entry of a keycode into the keypad of the vehicle to allow access to the vehicle.

FIG. 4 illustrates an example process 400 for the entry of a keycode into the keypad 118 of the vehicle 102 to allow access to the vehicle 102. In an example, the process 400 may be performed by the vehicle 102 in the scenario 200, in the context of the system 100. At operation 402, the process 400 begins with the vehicle 102 identifying an initial connection between the vehicle 102 and the mobile device 104 (e.g., the mobile device 104-B of the scenario 200). This initial connection may be, for instance, via BLE.

At operation 404, the vehicle 102 identifies that pairing is desired using the keypad 118. For instance, if the NFC sensors 114 are not functioning properly or too much interference is present, the user may choose to input the BLE confirmation code through the keypad 118 instead. This may be signified with a unique double button press (e.g., the user pressing both the 1 and the 3) to inform the controller 108 of BLE pairing mode. This unique press may be followed by transmission of the BLE confirmation code from the BLEM 112 to the controller 108. Or, in other examples, when performing out-of-band pairing it may generally be necessary to input a confirmation code via the keypad 118.

At operation 406, the vehicle 102 sends information indicative of which digits of the keycode are even and which digits are odd to the controller 108. This may allow for the controller 108 to receive the keycode to the buttons 120, which do not distinguish between even and odd values. Moreover, in only indicating the evenness/oddness (e.g., the least significant bit of each digit), the keycode may remain relatively secret. In some implementations, the controller 108 only interprets the values of the external button 120 presses by their positions (e.g., 1-5 rather than 0-9) the BLEM 112 may signify to the controller 108 which code digits are odd/even when the confirmation code is first generated (e.g., which may be done by the BLEM 112). For instance, if the code is "12357", the BLEM 112 may signify that the second digit is even, such that the user's input will always assume the second input is an even value.

The vehicle 102 sends the received keycode to the controller 108 at operation 408. In an example, the keypad 118 may receive keypresses to the buttons 120. The keypad 118 may, in some examples, collect the entire code and send the entire code to the controller 108. In another example, the keypad 118 may send each digit of the keycode to the controller 108 and allow the controller 108 to combine the presses into a complete code.

At 410, the vehicle 102 validates the keycode. Accordingly, the controller 108 may determine whether the code typed into the keypad is allowable for access of the user of the mobile device 104. If the code is allowable, then access may be granted and the process 400 ends. If not, then the process 400 also ends (or reverts back to operation 408 to receive another attempt at the keycode).

Referring back to FIG. 2, a unique key share access key may be managed by the cloud server 130. When PaaK is first configured on the vehicle 102, the cloud server 130 may send a CAK-like security key to the controller 108 (e.g., a code that is much lengthier than the keypad codes that are entered by a user, the code instead having security requirements similar to the CAK). This value may then be deployed to the key share requestor's phone (e.g., the mobile device 104-B), such that each subsequent tap after initial connection would transmit the key share access key instead. (For instance, the key share access key may be transmitted as described in the process 300, with the key share access key sent instead of the CAK). This message provided via NFC 106 may include a header such that the BLEM 112 may be instructed to gateway the message to the controller 108 for unlock validation.

This key share access key may be also dynamically-generated each time a key share request is made, whereby the key share access key is included with the CAK in the original pairing transmission. The key share access key may then be revocable via a message from the cloud server 130 relayed through owner's phone (e.g., the mobile device 104-A) once the key share period is over.

Figure 5:
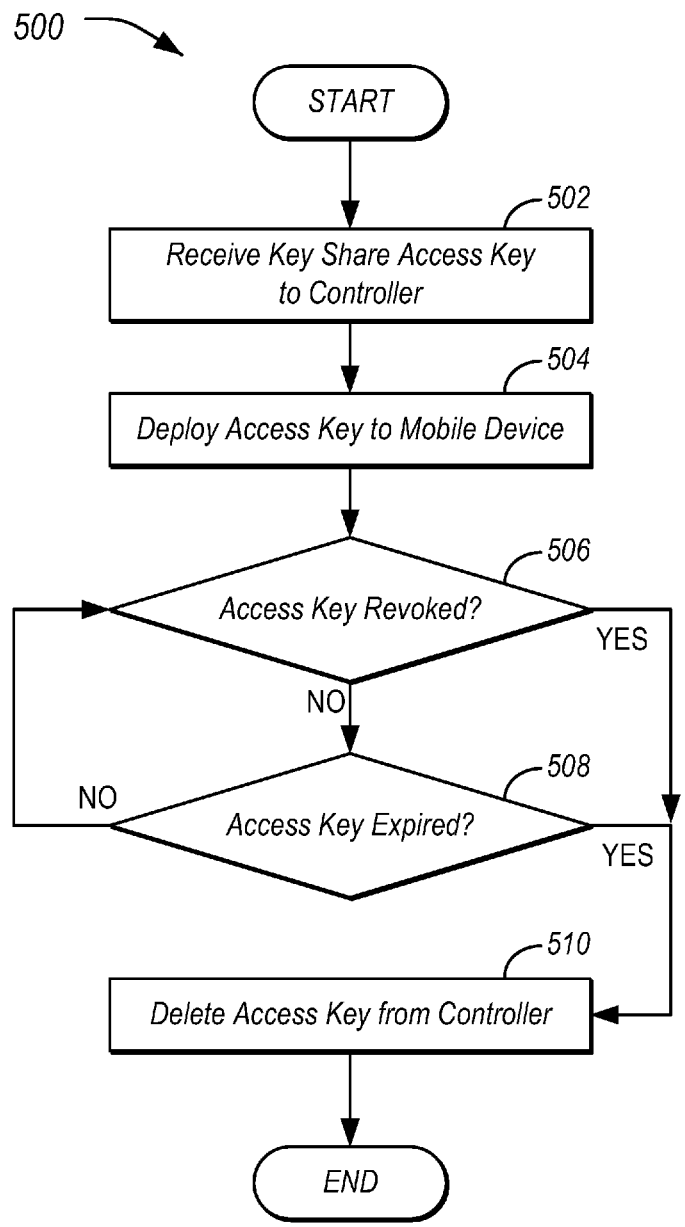
FIG. 5 illustrates an example process for the management of a revocable key share access key.

FIG. 5 illustrates an example process 500 for the management of a revocable key share access key. In an example, the process 500 may be initiated responsive to receipt of the access credentials from the cloud server 130.

At operation 502, the vehicle 102 receives a key share access key to the controller 108. In an example, the key share access key may be included in security credentials sent to the vehicle 102 responsive to the mobile device 104-A of a sharing user allowing the mobile device 104-B of another user to access the vehicle 102.

At operation 504, the vehicle 102 deploys the key share access key to the mobile device 104. In an example, the mobile device 104-B may perform direct out-of-band pairing to facilitate vehicle access, for example using the process 300. Responsive to validation of the credentials in the process 300, the vehicle 102 may provide the key share access key to the mobile device 104-B, for the mobile device 104-B to provide in further instances where the mobile device 104-B requests access to the vehicle 102.

At operation 506, the vehicle 102 determines whether the key share access key is revoked. In an example, the vehicle 102 may receive a message from the cloud server 130 revoking the key share access key. This may be done, for instance, responsive to the cloud server 130 receiving a message from the mobile device 104-A indicating that the user no longer wishes to allow the mobile device 104-B to share the vehicle 102. If the key is revoked, control passes to operation 510. Otherwise, control continues to operation 508.

At operation 508, the vehicle 102 determines whether the key share access key has expired. In an example, the key share access key may expire responsive to a timeout (e.g., predefined for key share access keys, specified by the key share access key, etc.). In another example, the key share access key may expire responsive to the key share access key being used a predefined number of times (e.g., predefined for key share access keys, specified by the key share access key, etc.). If so, control passes to operation 510. If not, the process returns to operation 506.

At operation 510, the vehicle 102 deletes the key share access key from the controller. Accordingly, the key share access key may no longer be available for authentication of users. After operation 510, the process 500 ends.

Computing devices described herein, such as the mobile devices 104, controller 108, and cloud server 130, generally include computer-executable instructions where the instructions may be executable by one or more computing devices such as those listed above. Computer-executable instructions may be compiled or interpreted from computer programs created using a variety of programming languages and/or technologies, including, without limitation, and either alone or in combination, JAVA™, C, C++, C#, VISUAL BASIC, JAVASCRIPT, PYTHON, PERL, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a keypad mounted to an exterior of the vehicle, the keypad having a plurality of buttons;
   a body controller, programmed to
      receive an input sequence entered via the keypad,
      validate whether the input sequence matches a predefined keycode, and
      confirm pairing a mobile device to the vehicle responsive to the input sequence matching the keycode; and
   a short-range wireless controller, programmed to
      identify an initial wireless connection from the mobile device to the vehicle,
      identify to use the keypad for keycode pairing of the mobile device to the vehicle,
      generate the keycode,
      send the keycode to the mobile device for display, and
      responsive to successful authentication of the mobile device to the vehicle, send a key share access key to the mobile device to be provided from the mobile device to the vehicle for further authentications.

2. The vehicle of claim 1, wherein:
   each button of the keypad represents both a first value and a second value;
   the short-range wireless controller is programmed to indicate to the body controller which values of the keycode are the first value and which are the second value; and
   the body controller is further programmed to validate the input sequence assuming the input sequence correctly entered the first value or the second value according to indications of which values of the keycode are the first value and which are the second value.

3. The vehicle of claim 2, wherein, for each button, the first value is an even number, and the second value is an odd number.

4. The vehicle of claim 1, wherein the short-range wireless controller is further programmed to identify to use the keypad responsive to receipt of a predefined input to the keypad.

5. The vehicle of claim 4, wherein the predefined input is a simultaneous press of a plurality of the buttons.

6. The vehicle of claim 1, wherein the initial wireless connection is over Bluetooth low energy (BLE).

7. The vehicle of claim 1, wherein the body controller is further programmed to receive a message from a cloud server revoking the key share access key, such that the key share access key is no longer available for further authentications.

8. The vehicle of claim 1, wherein the body controller is further programmed to expire the key share access key responsive to the key share access key being used for successful access a predefined number of times.

9. A method comprising:
   receiving a keycode, including a sequence of values to pair a mobile device to a vehicle;
   receiving an input sequence entered via a keypad of the vehicle, the keypad having a plurality of buttons;
   validating, by a controller, whether the input sequence matches the keycode;
   confirming access responsive to the input sequence matching the keycode; and
   responsive to successful authentication of the mobile device to the vehicle, sending a key share access key to the mobile device to be provided from the mobile device to the vehicle for further authentications.

10. The method of claim 9, further comprising:
    identifying an initial wireless connection from the mobile device to the vehicle;
    identifying to use the keypad for keycode pairing of the mobile device to the vehicle;
    generating the keycode; and
    sending the keycode to the mobile device for display.

11. The method of claim 9, further comprising receiving a message from a cloud server revoking the key share access key, such that the key share access key is no longer available for further authentications.

12. The method of claim 9, further comprising expiring the key share access key responsive to the key share access key being used for successful access a predefined number of times.

13. The method of claim 9, further comprising:
indicating which of the sequence of values are even and which are odd, each button representing both an even value and an odd value such that it cannot be determined whether an even value or an odd value was entered; and
validating the input sequence assuming the input sequence entered even or odd values correctly according to predefined indications provided to the controller of which values of the keycode are even and which are odd.

14. A method, comprising:
receiving a keycode, including a sequence of values to pair a mobile device to a vehicle;
receiving an input sequence entered via a keypad of the vehicle, the keypad having a plurality of buttons;
validating, by a controller, whether the input sequence matches the keycode;
confirming access responsive to the input sequence matching the keycode; and
responsive to identifying an initial wireless connection from the mobile device to the vehicle, displaying a message indicating the mobile device to be placed against a near-field communication reader of the vehicle to transmit a key to the vehicle.

15. The method of claim 14, further comprising:
indicating which of the sequence of values are even and which are odd, each button representing both an even value and an odd value such that it cannot be determined whether an even value or an odd value was entered; and
validating the input sequence assuming the input sequence entered even or odd values correctly according to predefined indications provided to the controller of which values of the keycode are even and which are odd.

16. A system comprising:
a keypad mounted to an exterior of a vehicle, the keypad having a plurality of buttons a body controller; and
a short-range wireless controller, programmed to
identify an initial wireless connection from a mobile device to the vehicle,
identify to use the keypad for keycode pairing of the mobile device to the vehicle responsive to receipt, to the keypad, of receipt of a predefined input including a simultaneous press of a plurality of the buttons,
generate a keycode including a sequence of values,
send the keycode to the mobile device for display, and
responsive to successful authentication of the mobile device to the vehicle, send a key share access key to the mobile device to be provided from the mobile device to the vehicle for further authentications,
wherein the body controller is programmed to
receive an input sequence entered via the keypad,
validate whether the input sequence matches the keycode, and
confirm access responsive to the input sequence matching the keycode.

17. The system of claim 16, wherein:
each button of the keypad represents both a first value and a second value;
the short-range wireless controller is programmed to indicate to the body controller which values of the keycode are the first value and which are the second value; and
the body controller is further programmed to validate the input sequence assuming the input sequence correctly entered the first value or the second value according to indications of which values of the keycode are the first value and which are the second value.

* * * * *